US012539586B2

(12) United States Patent
Frenken

(10) Patent No.: US 12,539,586 B2
(45) Date of Patent: Feb. 3, 2026

(54) HYDRAULIC WORK TOOL WITH A DEVICE FOR IMPACT DAMPING

(71) Applicant: GUSTAV KLAUKE GMBH, Remscheid (DE)

(72) Inventor: Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 111 days.

(21) Appl. No.: 18/265,175

(22) PCT Filed: Dec. 2, 2021

(86) PCT No.: PCT/EP2021/084030

§ 371 (c)(1),
(2) Date: Jun. 2, 2023

(87) PCT Pub. No.: WO2022/117753

PCT Pub. Date: Jun. 9, 2022

(65) Prior Publication Data

US 2024/0009816 A1 Jan. 11, 2024

(30) Foreign Application Priority Data

Dec. 3, 2020 (DE) ......................... 102020132185.6
Mar. 23, 2021 (DE) ......................... 102021107120.8

(51) Int. Cl.
*B25B 27/10* (2006.01)
*B25F 5/00* (2006.01)

(52) U.S. Cl.
CPC .............. *B25B 27/10* (2013.01); *B25F 5/005* (2013.01)

(58) Field of Classification Search
CPC .......... B25F 5/005; B25F 5/006; B25F 27/10; B23D 29/002
See application file for complete search history.

(56) References Cited

U.S. PATENT DOCUMENTS 2,863,346 A 12/1958 Cobaugh et al.
3,267,573 A 8/1966 Hill
(Continued)

FOREIGN PATENT DOCUMENTS

CH 370617 A 7/1963
WO WO2003084719 A2 10/2003
(Continued)

OTHER PUBLICATIONS

International Search Report and Written Opinion for PCT Application No. PCT/EP2021/084030, dated Apr. 7, 2022.
(Continued)

*Primary Examiner* — Thomas E Lazo
(74) *Attorney, Agent, or Firm* — Klintworth & Rozenblat LLP

(57) ABSTRACT

The invention relates to a hydraulic cylinder (6) with a hydraulically actuatable working piston (10) movable therein for transferring a working force to an object (20) to be processed outside of the hydraulic cylinder (6) accompanied by the buildup of a counterforce, wherein the working piston (10) has an actuation surface (12), the actuation surface (12) borders an actuation space present between the working piston (10) and the hydraulic cylinder (6) in a working direction (R) in which the working force is transferred, and for executing an operation, hydraulic fluid can act for moving the working piston (10) in the working direction (R) toward the actuation surface (12), accompanied by an enlargement of the actuation space. The invention further relates to a hydraulic work tool (1) with a hydraulic cylinder (6), and to a shock absorption method using such a hydraulic cylinder (6). In order to achieve an effective shock absorption, the invention proposes that an intermediate piston (11) be arranged before the working piston (10) in the working direction (R), that the actuation space be divided by the intermediate piston (11) into an entrance space (14) and a working space (15), wherein the entrance space (14) is formed between a cylinder floor (21) and the intermediate piston (11), and the working space (15) is formed between the working piston (10) and the intermediate piston (11), that the hydraulic fluid can flow out of the entrance space (14) into the working space (15), accompanied by an enlargement of the working space (15), and that a mechanical coupling
(Continued)

between the working piston (10) and the intermediate piston (11) can compensate for an actuation emanating from the hydraulic fluid located in the working space (15) given a loss in counterforce.

22 Claims, 13 Drawing Sheets

(56) References Cited

U.S. PATENT DOCUMENTS

| | | | | |
|---|---|---|---|---|
| 7,412,868 | B2 * | 8/2008 | Frenken | B25B 27/10<br>72/407 |
| 10,821,593 | B2 * | 11/2020 | Frenken | F15B 15/1447 |
| 11,285,596 | B2 * | 3/2022 | Frenken | B25B 27/023 |
| 2019/0240826 | A1 * | 8/2019 | Frenken | B25B 27/10 |

FOREIGN PATENT DOCUMENTS

| | | |
|---|---|---|
| WO | WO2017080877 A1 | 5/2017 |
| WO | WO2018065513 A1 | 4/2018 |

OTHER PUBLICATIONS

International Preliminary Report on the Patentability for PCT Application No. PCT/EP2021/084030, dated Mar. 12, 2020.

* cited by examiner

HYDRAULIC WORK TOOL WITH A DEVICE FOR IMPACT DAMPING

AREA OF TECHNOLOGY

The disclosure first relates to a set-up comprising a hydraulic cylinder and a hydraulically actuatable working piston, wherein the working piston is moveable within the hydraulic cylinder and is designed to transmit a working force to an object to be machined outside the hydraulic cylinder, building up a counterforce, wherein the working piston furthermore comprises a pressurization surface, which limits a pressurization space existing between the working piston and the hydraulic cylinder in a direction of operation, in which the working force is transmitted, furthermore comprising hydraulic fluid provided in the hydraulic cylinder, wherein an ingress of the hydraulic fluid into the pressurization space enlarges the pressurization space and acts on the working piston to move the working piston in the direction of operation to the pressurization surface.

The disclosure also relates to a method for the shock absorption of a hydraulically actuated working piston that is moveable within a hydraulic cylinder, for transmitting a working force to an object to be machined outside the hydraulic cylinder, building up a counterforce, wherein the working piston comprises a pressurization surface, the pressurization surface limits a pressurization space existing between the working piston and the hydraulic cylinder in a direction of operation, in which the working force is transmitted, and hydraulic fluid is introduced into the pressurization space for the movement of the working piston in the direction of operation onto the pressurization surface, thereby enlarging the pressurization space.

PRIOR ART

Hydraulic cylinders with a moveable, hydraulically actuated working piston have already become known in various respects. For example, reference should be made to WO 2003/084719 A2 (U.S. Pat. No. 7,412,868 B2).

From the U.S. Pat. No. 2,863,346 A, a hydraulic cylinder is known, in which two hydraulic pistons are arranged one after another. Both hydraulic pistons are working pistons that transmit a working force to an object outside the hydraulic cylinder. At the beginning of a working process, the second working piston, which is second in the direction of operation, is moved by the first working piston by means of a direct system. When the first working piston has reached the limit of its movability, for example because the effect on the object has come to an end, and this results in a further increase in pressure in the hydraulic fluid, a pressure-dependent valve opens in the first working piston. Hydraulic fluid flowing through the first working piston then moves the second working piston, filling a space between the first and second working pistons so that the second working piston can also act on the object outside the hydraulic cylinder. In the event of a sudden drop in a counterforce, the second working piston can transmit shock energy to the hydraulic cylinder via a return spring, which is then compressed in a force-transmitting manner.

From WO 2018/065513 A1 (US 2019/0240826 A1), a hydraulic cylinder with a moveable, hydraulically actuated working piston as well as a hydraulic working tool with a working head and a hydraulic cylinder and, furthermore, a method for shock absorption of a hydraulically loadable working piston that is moveable within a hydraulic cylinder is known. In order to achieve the desired shock absorption, it is proposed to decouple the gearbox from the electric motor, which ultimately drives the pump for pumping the hydraulic agent, i.e., to develop a stop-limited mobility between the gearbox and the electric motor.

From WO 2017/080877 A1 (U.S. Pat. No. 10,821,593 B2), a hydraulic cylinder or a working tool and a method for shock absorption are known in which a hydraulic chamber filled with hydraulic fluid is formed in the direction of operation following the working piston, which becomes smaller when the working piston moves in the direction of operation, displacing hydraulic fluid from this hydraulic chamber into the pressurization space. In the event of a sudden loss of the counterforce, a damping of an abrupt movement of the drive piston initiated by this is achieved in the direction of operation via the filled hydraulic chamber.

From U.S. Pat. No. 3,267,573 A, a set-up is known in which the working piston, when a drop in the counterforce occurs, continues unhindered until it is stopped at a shock-absorbing element. Furthermore, a set-up is known from CH 370 617 A in which a working piston is moved into a cutting position with the help of combustion gases released during an explosion. The working piston carries out the movement forced by this unhindered and continues unhindered until it reaches a stop position.

SUMMARY OF THE INVENTION

Based on prior art, for example, in accordance with WO 2017/080877 A1, the disclosure deals with the problem of forming a set-up of the type mentioned in a favourable way with regard to shock absorption or specifying an favourable method for shock absorption with regard to shock absorption.

This problem is first solved with regard to the set-up of the object of claim 1, wherein it is based on the fact that the working piston is designed to be mechanically restrained before reaching a stop position in the direction of operation, by a mechanical coupling between the working piston and a counterholder when a drop in the counterforce occurs, thereby preventing additional movement of the working piston in the direction of operation, which can occur without the drop of the counterforce, wherein the counterholder is an intermediate piston arranged in the direction of operation in front of the working piston, and the intermediate piston comprises a coupling extension designed to interact with a coupling stop of the working piston or the counterholder formed by the hydraulic cylinder, wherein the working piston is mechanically coupled to the hydraulic cylinder by means of a spindle part.

This task is also solved with regard to the set-up of the object of claim 2, wherein it is based on the fact that the working piston is designed to be mechanically restrained before reaching a stop position in the direction of operation by a mechanical coupling between the working piston and a counterholder when a drop in the counterforce occurs, thereby preventing additional movement of the working piston in the direction of operation, which can occur without a drop in the counterforce, wherein the counterholder is an intermediate piston or is formed by the hydraulic cylinder, and a coupling extension is formed on the counterholder, and the working piston comprises a coupling stop.

With regard to the method of shock absorption, the task is solved with regard to the object of the claims, wherein it is based on the fact that in the event of a sudden drop in the counterforce before reaching a stop position in the direction of operation, further movement of the working piston in the direction of operation without the drop in the counterforce is prevented by a mechanical restraint of the working piston, wherein the hindrance is caused via a mechanical coupling between the working piston and a counterholder, that an intermediate piston is provided as a counterholder, that the intermediate piston is arranged in front of the working piston in the direction of operation, that the pressurization space is divided by the intermediate piston into a preliminary space and a working space, wherein the preliminary space is arranged between a cylinder base and the intermediate piston, and the working space is arranged between the working piston and the intermediate piston, that hydraulic fluid is transmitted from the preliminary space into the working space with an enlargement of the working space and, in the event of a sudden drop in the counterforce, a mechanical coupling between the working piston and the intermediate piston prevents the pistons from moving away from each other, or that the hydraulic cylinder is provided as a counterholder and the mechanical coupling between the working piston and the hydraulic cylinder is carried out by means of a spindle part.

Mechanical restraint takes effect with the sudden drop in counterforce. Typically, for example, during a cutting process when the counterforce drops, the working piston has not yet reached a stop position in the direction of operation, so further movement of the working piston in the direction of operation is possible. The mechanical restraint does not allow this possible further movement, which is then very often jerky and leads to a power surge on the hydraulic cylinder and, where applicable, a work apparatus as a whole in which the hydraulic cylinder is arranged. Different embodiments are possible for this mechanical retention, as explained below. Until the drop in the counterforce occurs, the movement of the working piston in the direction of operation is practically unhindered. The operation, preferably a separation or cutting off, can be carried out with such a hydraulic cylinder, as is known with such hydraulic cylinders or hydraulic working tools. The adverse effect of a sudden movement of the working piston due to the elimination of the counterforce, which can result in heavy loads on the hydraulic cylinder and the working tool as a whole, is significantly reduced or even no longer relevant. In particular, this also significantly extends the service life of such a hydraulic cylinder or a working tool with such a hydraulic cylinder if such stress-causing work processes are carried out repeatedly or often with the hydraulic cylinder or the working tool.

The mechanical coupling between the working piston and a counterholder in general, the hydraulic cylinder or an intermediate piston still arranged between the working piston and the cylinder base, enables a retention that is preferably effective only for a short time. The retention leads to an encapsulation of hydraulic fluid in the working space between the working piston and the intermediate piston or the pressurization space in general, which is also preferably only effective for a short time. This hydraulic fluid is under very high pressure shortly before the end of a work process. It can be pressures of 200 bar or more, up to 600, 700 or 800 bar or even more. In particular, if the work process is suddenly terminated, for example in the sense of a cutting process by separating an object by means of cutting edges moved by the working piston, the counterpressure acting on the working piston drops almost abruptly. The hydraulic fluid, which is usually very little compressible, nevertheless contains a considerable amount of stored energy due to the high pressure, which could lead to a sudden movement of the working piston in the direction of operation and a stopping on the hydraulic cylinder. The stored energy can also be caused or amplified by the fact that the hydraulic cylinder itself undergoes a certain elastic expansion due to the high pressure mentioned, which also represents a stored energy that has to be dissipated when the counterforce drops.

However, according to the mechanical coupling, whether between the working piston and the intermediate piston or between the working piston and a counterholder in general, as explained, the energy stored in the event of the sudden termination of the working process generally gives an opposite effect on the working piston and the intermediate piston or on the working piston and the counterholder, which cancels each other out, as it were, due to the mechanical coupling. There is no abrupt movement of either the working piston or the intermediate piston or, in the given case, the counterholder in general.

In the case of a hydraulic working tool designed as a cutting tool with a embodiment of the hydraulic cylinder as described above, it has surprisingly turned out that when cutting an object made of a brittle material, such as an alloy steel rod or a cast steel piece or the like for example, it is not only achievable that in the event of a sudden breakthrough of the object occurring at the end of the work process, practically no or only a very reduced impact load is to be absorbed in the working tool, but that the cutting process as such is also much more inexpensive. At the end of the cutting process, there is no flying away of cut sections, but the desired separation can be achieved without uncontrolled behaviour of the sectional parts.

Mechanical restraint is achievable by means of a mechanical coupling between the working piston and a counterholder. The counterholder can be provided in various embodiments.

First of all, it is further preferred that the counterholder is an intermediate piston. The intermediate piston is arranged between the working piston and the hydraulic cylinder between the working piston and a cylinder base of the hydraulic cylinder in the direction of operation.

The counterholder may also be provided by the hydraulic cylinder itself, as explained in more detail below.

With regard to an intermediate piston embodiment, it is preferred that the intermediate piston is arranged in the direction of operation in front of the working piston, that the pressurization space is divided by the intermediate piston into an preliminary space and a working space, wherein the preliminary space is formed between the cylinder base and the intermediate piston and the working space between the working piston and the intermediate piston, that hydraulic fluid can flow from the preliminary space into the working space with an enlargement in the working space, and that by means of a mechanical coupling between the working piston and the intermediate piston, a pressurization emanating from the hydraulic fluid in the working space can be compensated for when the counterforce is eliminated.

With regard to the shock absorption method, in the case of an embodiment of a hydraulic cylinder with the intermediate piston, the intermediate piston is arranged in the direction of operation in front of the working piston in the manner already described, the pressurization space is divided by the intermediate piston into a preliminary space and a working space, and the preliminary space is arranged between the cylinder base and the intermediate piston and the working space between the working piston and the intermediate piston. Hydraulic fluid is fed from the preliminary space into the working space with an enlargement of the working space when carrying out a work process. Furthermore, in the event of a sudden drop in the counterforce, a mechanical coupling between the working piston and the intermediate piston prevents these pistons from moving away from each other.

Furthermore, in the case of the embodiment with the intermediate piston, it is preferred that only the said working piston acts on the object. The intermediate piston is, as it were, only free-flying in the hydraulic cylinder, with the exception of the mechanical coupling given at least at the end of the working process with regard to a relative movement to the working piston in the direction of the cylinder base.

With regard to mechanical coupling, the intermediate piston has a coupling extension for interaction with a coupling stop of the working piston. This coupling extension can be formed in different ways. Initially, it may be a shoulder-like extension, which can meet a behind, step-like enlargement of the working piston.

However, a threaded part, e.g., with a very large thread pitch, for example like in a drill, can also be involved, which is accommodated in a corresponding thread opening of the working piston. At the beginning of an operation, when the working space is enlarged by pumping hydraulic fluid into the working space, this can lead to a rotational movement of the intermediate piston in this embodiment. The sudden relaxation at the end of the operation then leads to a tendency toward an abrupt movement in terms of a separation in relation to the intermediate piston and the working piston. Not least owing to the inertia of the intermediate piston which is then to be made to rotate in an opposite direction, this tendency toward an abrupt movement causes a preferably short-term, momentary blockage between the thread extension of the intermediate piston and the thread receptacle of the working piston. This also makes it possible to achieve a desired, as it were, rigid coupling between the intermediate piston at the time when the operation suddenly ends. This can here advantageously be achieved independently of a relative distance between the working piston and the intermediate piston during an operation.

By contrast, with regard to the coupling extension in terms of a shoulder and the counter-stop in terms of a step, achieving the desired effect requires that the abutment be present before the operation has ended. To this end, it can be provided that the abutment be achieved based upon a specific minimum travel distance of the working piston. The minimum travel distance is selected in such a way as to be distinctly shorter than the travel distance typically reached once the operation has ended. For example, the travel distance typically reached at the end of a travel distance can correspond to 80 to 90 percent of a maximum travel distance. For example, the minimum travel distance can measure between 40 and 70 percent of the maximum travel distance.

Once the minimum travel distance has been reached, the working piston can preferably nevertheless still move even further in the working direction. In this case, it then moves together with the intermediate piston. The working piston and the intermediate piston in this case move synchronously with each other starting when the minimum travel distance has been reached.

In further detail, the coupling extension can penetrate through the actuation surface of the working piston. The stop means can correspondingly be formed inside of the working piston. The working piston can have an opening, preferably resembling a blind hole, into which an extension of the intermediate piston stretches. The extension can have the stop shoulder.

In another possible design, the extension can have the mentioned spindle configuration. The spindle nut can here also be arranged behind the actuation surface of the working piston in the working direction. The spindle nut is preferably fixedly connected, possibly also as one piece, with the working piston in design. However, it can also be rotatably accommodated in the working piston. In such a case, it is not necessary that the spindle itself or possibly the intermediate piston with which it is connected be rotatable, or in any event rotate during an operation. In particular, such a configuration is advantageous if the coupling extension, e.g., possibly the spindle, is fastened directly in the hydraulic cylinder, and an intermediate piston is not present.

In any event, it is preferred that the coupling stop be formed behind the actuation surface in the actuation direction.

The intermediate piston can already be pretensioned in a position spaced apart from the working piston outside of an operation or before an operation begins. This makes it possible to safely ensure that the working space also gets filled with hydraulic fluid during an operation, and that the working piston is concurrently spaced apart from the intermediate piston as desired, for example until the mentioned stop position has been reached. Meanwhile, it is preferred that no pretensioning be required.

In a further detail, the intermediate piston can have a passage opening provided with a valve, preferably with a valve that can be controlled between an opening position and a closing position, so as to allow hydraulic fluid to stream out of the working space into the entrance space. The valve can here preferably be easily opened in the direction toward the working space, but in contrast cannot be opened in the direction toward the entrance space, or only under special conditions.

It is here further preferred that the valve enable a reduced throughput of hydraulic fluid in the closing position by comparison to the opening position. In this case, the valve does not close completely. When it comes to the mentioned end of an operation, e.g., resulting from an abrupt penetration through the object being acted upon, the effect of the hydraulic fluid exposed to a high pressure in the working space is nevertheless halted, since this hydraulic fluid cannot abruptly relax. However, the reduced throughput allows for a time delayed relaxation stretched out over time, so that the described stored energy builds up in the working space, without a significant damaging effect on the work tool being associated therewith. Without the mentioned measures, the abruptly dropping load here exerts its effect within a very short timeframe, typically within a few milliseconds, while the configuration described here makes it possible to extend the time to several tenths of a millisecond, for example 20 to 40 ms, while simultaneously given a decisively lower maximum load of the hydraulic cylinder, up to a maximum load that is no longer perceptible.

It can further be provided that the valve be controllable through impact on the cylinder floor in an opening position. If necessary, a second, larger opening position can here be involved. If hydraulic fluid runs back into a hydraulic tank, e.g., of the work tool, after the described end to an operation, which can be initiated by steering a return valve into the opening position, with an automatic opening of a return valve also being possible depending on a specific reached pressure (for example, see WO 99/019947 A1 or U.S. Pat. No. 6,276,186 B1), the working piston and the intermediate piston move back in the direction toward the cylinder floor. This usually happens due to a restoring spring, which is supported by the hydraulic cylinder and acts on the working piston. Accordingly, the intermediate piston reaches the cylinder floor after a certain, relatively short distance. The resultant steering of the valve in the intermediate piston into the (larger) opening position can then cause the hydraulic fluid to run back out of the working space faster. The working space diminishes in the process, since the working piston once again moves closer to the intermediate piston.

The mentioned valve is preferably pretensioned in its closing position, e.g., by a spring.

Alternatively or additionally, it can also be provided that the intermediate piston leaves a gap opening to an inner cylinder surface of the hydraulic cylinder, so as to allow hydraulic fluid to stream out of the entrance space into the working space. In such an embodiment, it can also be provided that the mentioned valve, which is preferably nonetheless also formed in the intermediate piston in this embodiment, allow no hydraulic fluid to flow out of the working space into the entrance space in its closing position. In the event that the operation has ended in terms of an abrupt end, hydraulic fluid can thus only stream into the entrance space via the gap opening. As a result of the gap effect, this process is also attenuated and stretched out over time in the mentioned sense as well, so that the desired gentle reduction in stored energy can be advantageously achieved in this way too.

The intermediate piston is further preferably actuatable independently of a working force with a retention force that helps hydraulic fluid to flow into the working space via the intermediate piston to enlarge the working space. For example, this retention force can be reached by supporting the intermediate piston against the working piston with a spring, as already mentioned. This spring support tends to cause the working piston to increasingly move away from the intermediate piston while performing an operation. However, at least in an embodiment where a gap opening between an inner surface of the hydraulic cylinder and the intermediate piston does not matter, this retention force can also consist of a frictional force between the intermediate piston and an inner surface of the hydraulic cylinder, e.g., brought about on a circumferential seal of the intermediate piston that interacts with the mentioned inner surface of the hydraulic piston.

It goes without saying that the retention force in any event allows a movement by the intermediate piston in the working direction. In an embodiment with a shoulder-like extension and a stepped enlargement, this movement also preferably arises before there is a rigid coupling between the working piston and the intermediate piston. The intermediate piston can be at least slightly removed from the cylinder floor during an operation. In this regard, it is preferred that a movement by the intermediate piston not arise before the rigid coupling exists between the working piston and the intermediate piston. During an operation, the intermediate piston can until then abut against the cylinder floor, and even have abutted against the working piston beforehand. With regard to the cylinder floor, a projection—e.g., ribbed or nubbed—can be formed on the working piston, which ensures that the hydraulic fluid reaches an entire actuation surface of the intermediate piston.

It is also preferred that the working piston already be located at a certain distance from the intermediate piston at the beginning of an operation. The working piston preferably does not directly abut against the intermediate piston, but rather only via the hydraulic fluid also already present in the working space at the beginning of the operation.

The hydraulic work tool is correspondingly provided with a hydraulic cylinder in one of the embodiments described above.

As already mentioned, such a hydraulic work tool can be designed in particular as a cutting tool.

Such a hydraulic work tool typically has a storage space for hydraulic fluid, out of which the hydraulic fluid can be pumped by means of a pump preferably driven by an electric motor to perform an operation. A controller can further be provided which moves the already mentioned return valve into an opening position, e.g., given a drop in pressure, which can be considered as the end of a cutting process for a cutting tool, so that the hydraulic fluid can flow out of the hydraulic cylinder back into the supply space. In particular, it is also preferred that such a work tool be provided with an accumulator for operating the electric motor.

With regard to the shock absorption method, given a configuration of a hydraulic cylinder as previously described, or of a hydraulic work tool with a corresponding hydraulic cylinder, the intermediate piston is prevented from moving relative to the working piston in the direction toward the cylinder floor by a mechanical coupling with the working piston given a sudden drop in working force. This also corresponds to preventing a relative movement of the working piston and the intermediate piston toward each other in opposite directions.

With regard to the counter-bracket, the working piston can also be mechanically coupled with the counter-bracket via a spindle part. For this purpose, the spindle part can be fastened to the intermediate piston. However, it can also be fastened to the hydraulic cylinder itself, preferably to the cylinder floor.

In a further detail, the spindle part can be rotatable. In such a case, it is then further preferred that a spindle nut be provided in the working piston, relative to which the spindle part can be moved axially in the working direction. While the spindle part can here be immovable and the spindle nut rotatable, it is also possible for the spindle part to be rotatable and the spindle nut immovable.

The rotation of the spindle part can be achieved by turning the intermediate piston or a corresponding part of the hydraulic cylinder. However, the spindle part can also be rotatably fastened to the intermediate piston or a corresponding part of the hydraulic cylinder.

The spindle part can further be immovably provided in the intermediate piston or the hydraulic cylinder. In this case, the spindle nut is rotatably accommodated in the working piston. In a further detail, the spindle nut can initially be kept remote from its stop surface that was last effective by a spring element given a loss in counterforce in order to reduce frictional forces as much as possible. In a cross-section inclined to a longitudinal axis in which the working direction is given, the stop surface can also have a sloping design.

BRIEF DESCRIPTION OF THE DRAWING

The invention is additionally explained below based upon the attached drawing; the latter only illustrates exemplary embodiments, however. Shown here on.

DESCRIPTION OF THE EMBODIMENTS

Figure 11:
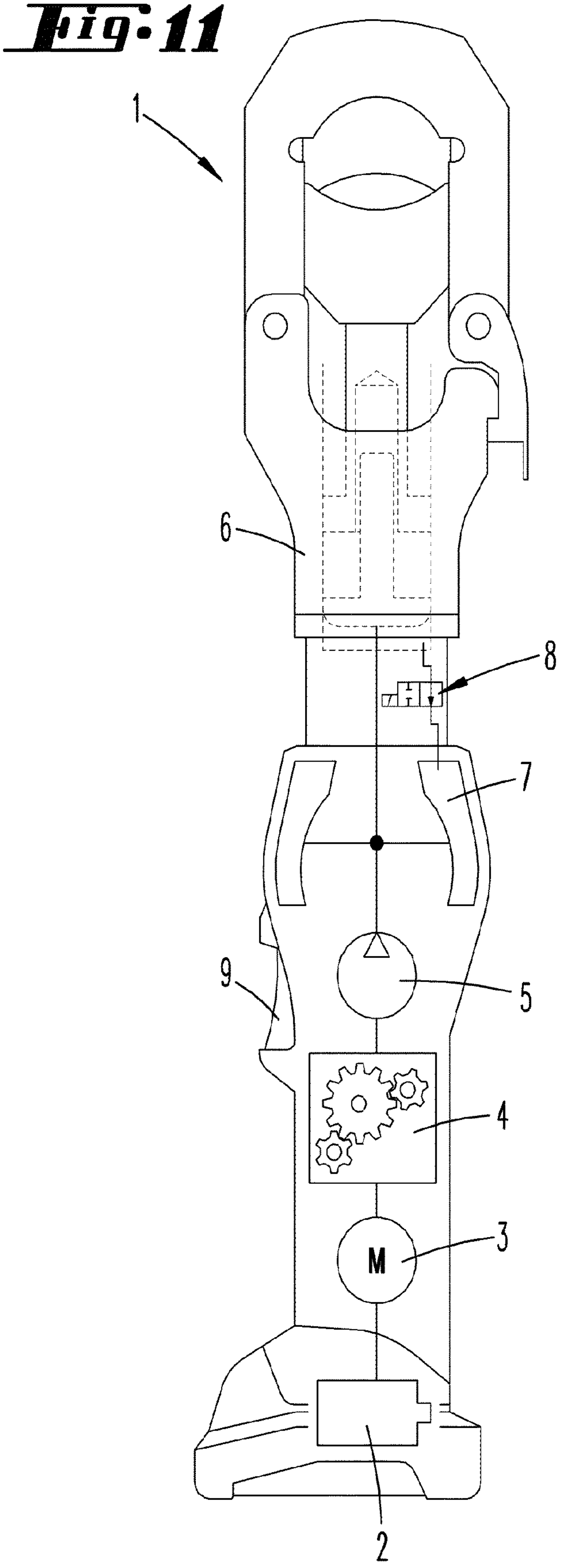
FIG. 11 is a schematic view of a complete hydraulic work tool.

A hydraulic work tool 1 is illustrated and described, initially with reference to FIG. 11. The hydraulic work tool 1 is designed as a hand tool in the exemplary embodiment. It preferably has an accumulator 2, an electric motor 3, advantageously a gearbox 4 and a pump 5. The pump 5 can be used to pump hydraulic fluid out of a supply space 7 into a hydraulic cylinder 6.

By means of a return valve 8, shown only schematically, which either moves automatically into an open position or can be controlled into an open position, hydraulic fluid can flow back from the hydraulic cylinder 6 into the supply space 7 after completion of a work process.

An only schematically depicted return valve 8, which either automatically travels into an opening position or can be steered into an opening position, can be used for hydraulic fluid to flow out of the hydraulic cylinder 6 and back into the supply space 7 after the operation has ended.

Given a preferably rodlike configuration of the hydraulic work tool 1, a gripping area can be provided that surrounds the motor 3 and/or the gearbox 4 and/or the pump 5.

An activating switch 9 can further be provided and may be proximate to the gripping area.

A first embodiment is shown with reference to FIGS. 1 to 4.

A working piston 10 and an intermediate piston 11 are arranged in the hydraulic cylinder 6.

The working piston 10 has an actuation surface 12. Present between the actuation surface 12 and an inner surface 13 of the hydraulic cylinder 6 is an actuation space, which is divided by the intermediate piston 11 into an entrance space 14 and a working space 15.

A working force for performing an operation can be transferred by means of the working piston 10 via transmission with a piston rod 16.

As evident in the exemplary embodiment, a working head 17 connected with the hydraulic cylinder 6 is designed as a cutting tool.

In a further detail, it is preferred that a first movable blade 18 be connected with the piston rod 16, and moved against a second fixed blade 19 in the working head 17 during a movement by the working piston 10. An object 20, for example a steel bolt in the exemplary embodiment, can be accommodated between the first and second blades 18, 19 for cutting purposes.

Figure 1:
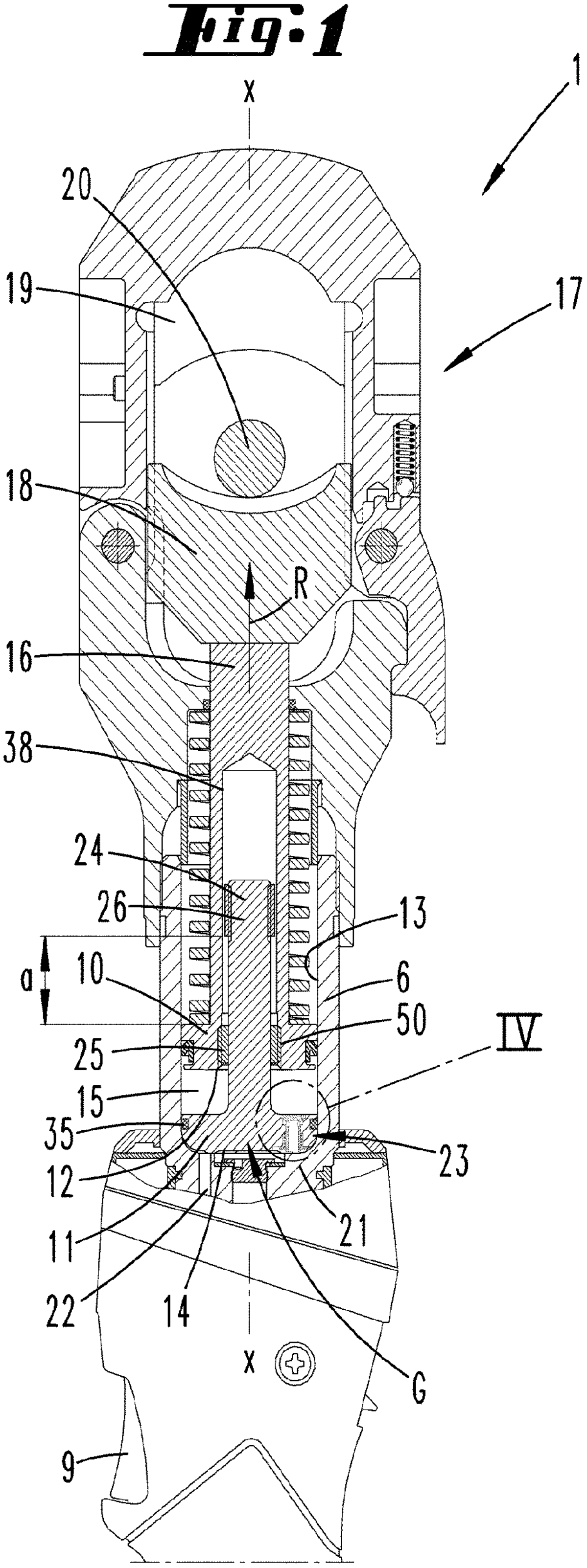
FIG. 1 is a longitudinal cross-section through a hydraulic cylinder with a working head in a first embodiment, before an operation begins.

The entrance space 14 is very small in an initial state as depicted in FIG. 1, and situated between a cylinder floor 21 and an allocated surface of the intermediate piston 11. Hydraulic fluid can be guided via a hydraulic line 22 out of the supply space by means of the already described pump 5 and into the entrance space 14, and from there by way of a valve 23 arranged in the intermediate piston 11 into the working space 15. While performing an operation, a rising hydraulic pressure here also arises in the working space 15, which leads to a continuing enlargement of the working space 15 as the working piston 10 moves in a working direction R.

The intermediate piston 11 has a coupling extension 24, which is designed to interact with a coupling stop 25 of the working piston 10.

In this first exemplary embodiment, and preferably, the coupling extension 24 is a radial projection extending radially outward in a direction transverse to a central axis x of the hydraulic cylinder 6. The radial projection can come to a stop in the working piston 10 against a stepped tapering which forms, preferably the coupling stop 25.

Figure 2:
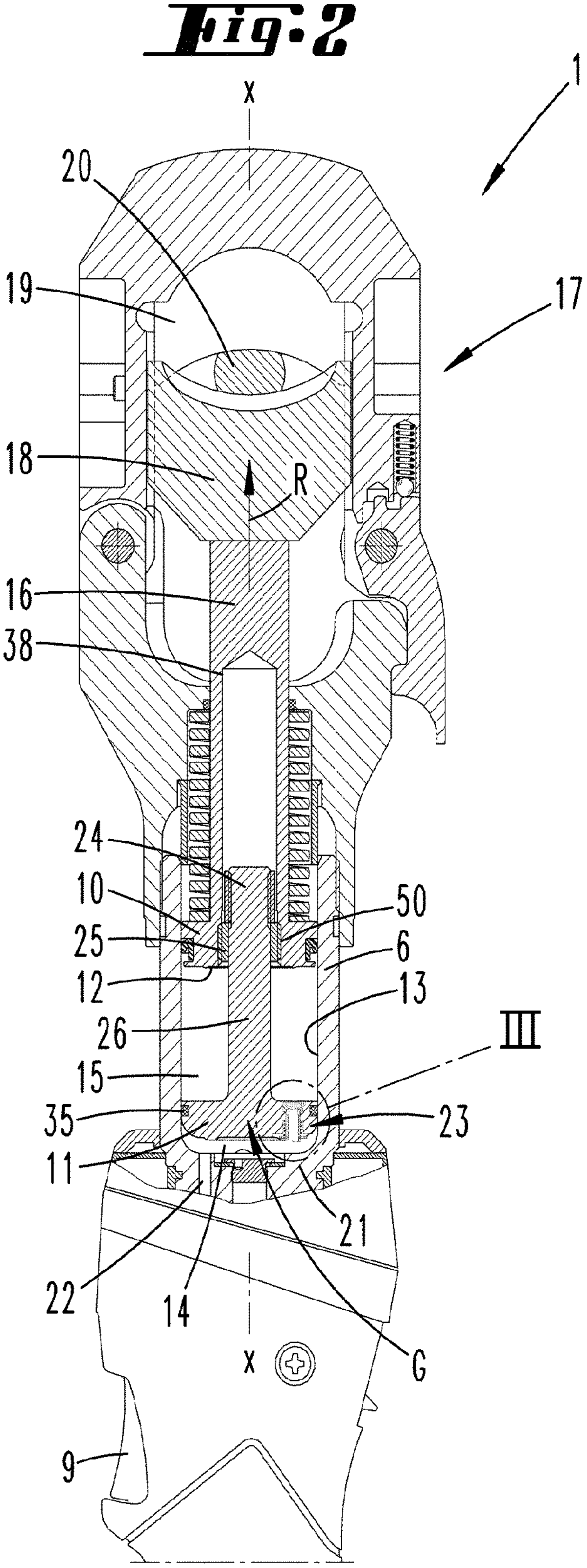
FIG. 2 is an illustration according to FIG. 1 at the end of an operation.

In the position in FIG. 2, the coupling extension 24 has come to abut against the coupling stop 25.

The coupling extension 24 is, at the embodiment and preferably, defined by an area, preferably an end area, of an intermediate piston rod 26 connected with the intermediate piston 11. The intermediate piston rod 26, and hence also the coupling extension 24, passes through a passage opening 50 in the actuation surface 12 of the working piston 10. In the exemplary embodiment, the coupling stop 25 is formed, preferably, behind the actuation surface 12 in an actuation direction, which here coincides with the working direction R in which the movable blade 18 moves toward the fixed blade 19.

During the course of an operation, hydraulic fluid flows via the entrance space 14, through the valve 23 into the working space 15 which cause the working piston 10 and the intermediate piston 11 to move out of the position shown in FIG. 1 into the position shown in FIG. 2. At once, the intermediate piston 11 also moves out of the position according to FIG. 1 into the position according to FIG. 2. As evident, the intermediate piston 11 moves for less of a distance during the operation than the working piston 10. Nonetheless, the entrance space 14 also enlarges during the operation.

If the working piston 10 has traveled so far relative to the intermediate piston 11 that an initial distance a between the coupling extension 24 and the coupling stop 25 has been used, meaning that the coupling extension 24 has come to abut against the coupling stop 25, a minimum travel distance of the working piston 10 has been reached. The working piston 10 thereafter usually still continues to move in the travel direction R. However, the intermediate piston 11 is then also moved along in the travel direction R through coupled motion with the working piston 10. Once the minimum travel distance has been reached, the working piston 10 and the intermediate piston 11 thus move synchronously with each other.

At the end of an operation, shortly before the object 20 is cut through in the exemplary embodiment, the working space 15 is filled with hydraulic fluid under a very high pressure, but at any rate a pressure of several 100 bar, for example 600 to 800 bar. A corresponding counterpressure is exerted by the first blade 18 and the piston rod 16, transferred by the working piston 10.

If now a sudden rupture of the object 20 takes place, e.g., as a result of the continued cutting process, the counterpressure is abruptly lost, and a stored energy of the hydraulic fluid trapped in the working space 15 between the working piston 10 and the intermediate piston 11, and possibly also a cylinder wall of the hydraulic cylinder 6 bordering the working space 15, can likewise be abruptly released without the precautions taken here, and in principle result in damage. The mechanical coupling provided for this purpose between the working piston 10 and the intermediate piston 11 guides the stored energy being released so as to apply force to the surface of the intermediate piston 11 facing the working piston 10 (upper surface in the exemplary embodiment) and the actuation surface 12 of the working piston 10. However, because the coupling extension 24 has come to abut against the coupling stop 25 in this position, the intermediate piston 11 and the working piston 10 cannot move away from each other. The sudden reduction in energy of the hydraulic fluid in the working space 15 is impeded. The forces acting in opposite directions on the working piston 10 and the intermediate piston 11 practically cancel each other out.

The valve 23, preferably, and also as shown in the drawings, is biased into a valve closing position, e.g. by means of a valve spring 34. Without such bias, however, the valve 23 is also pushed in the closing position upon a sudden removal of the counterpressure.

In the exemplary embodiment of FIGS. 1 to 4, the valve 23, preferably, is designed in such a way (see FIG. 3) that it leaves nevertheless a passage 27, providing a communication between the entrance space 14 and the working space 15. This outlet 27 is very small, so that the effect on the hydraulic fluid trapped in the working space 15 at the time the object 20 is cut through amounts to a practical seal. This prevents a sudden relaxation. Nonetheless, this energy stored in the hydraulic fluid can be slowly reduced in a time delayed manner, dampened by the slight possible reflux of hydraulic fluid through the closed valve 23.

The return valve 8, opening at the end of the operation and allowing thereby a return of hydraulic fluid out of the entrance space 14 and into the supply space 7, which allows the intermediate piston 11 to move in the direction toward the cylinder floor 21, initially together with the working piston 10, until it assumes the position according to FIG. 1 once again.

Figure 4:
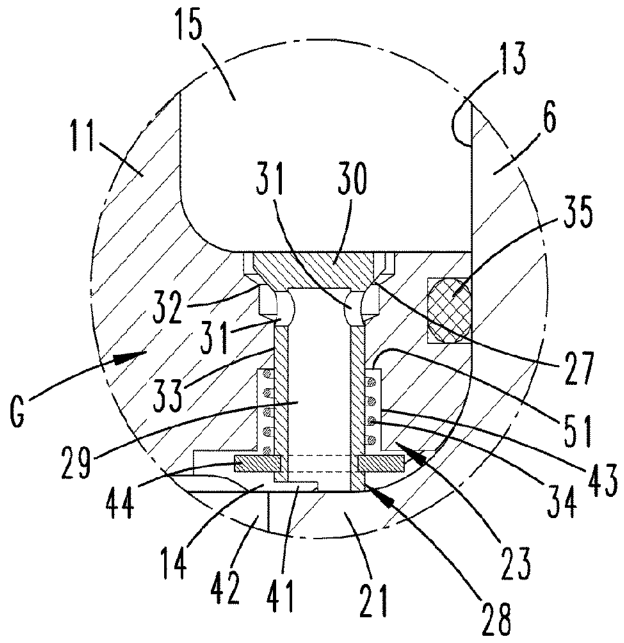
FIG. 4 is a view according to FIG. 3, in the position according to FIG. 1.

In the position according to FIG. 1, the valve 23 impacts the cylinder floor 21, and is thereby moved into the opening position according to FIG. 4.

In detail, the valve 23 can for this purpose have an extension 28 that protrudes over a subsurface of the intermediate piston 11 in the direction toward the cylinder floor 21. The valve 23 then impacts the cylinder floor 21 with the extension 28, and can thereby be moved into the opening position according to FIG. 4.

In further detail, the valve 23 includes a feedthrough section 29, which is preferably tubular in design, as in the exemplary embodiment. The feedthrough section 29 is sealed by a closure formation 30 on the upper side, i.e., toward the working space 15. However, the feedthrough section 29 does have one or several radial outlets 31, preferably two in the exemplary embodiment, through which hydraulic fluid can flow back nearly unimpeded from the working space 15 into the entrance space 14, and from there into the supply space 7 in the offset state of the feedthrough section 29 in the position according to FIG. 4. A radial opening 41 of the feedthrough section 29 proximate to the cylinder floor 21 works in the same way, so as to enable the hydraulic fluid to flow back in a return line 42 through the cylinder floor 21.

Figure 3:
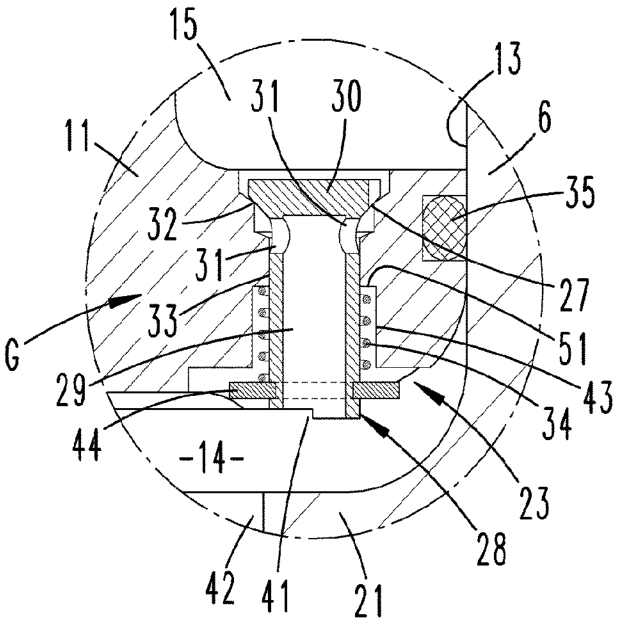
FIG. 3 is a magnified view of the valve located in the intermediate piston in the position according to FIG. 2.

When the valve 23 is in the closing position as shown in FIG. 3, the closure formation 30 abuts over nearly an entire periphery against a closure shoulder 32, which is formed in the intermediate piston 11. The closure shoulder 32 is part of a passage opening 33 in the intermediate piston 11, in which the feedthrough section 29 is movably captured with the closure formation 30.

However, the closure formation 30 and/or the closure shoulder 32 leaves the already mentioned outlet 27 over a part of the periphery, which even when the valve 23 is in the closing position as shown in FIG. 3 permits a slight flow of hydraulic fluid out of the working space 15 into the entrance space 14.

In the exemplary embodiment, the positioning of the valve 23 in the closing position is preferably achieved by a valve spring 34 that acts on the feedthrough section 29. To this end, the feedthrough section 29 can have a stop shoulder 44, which can be formed by a snap ring connected with the feedthrough section 29, as in the exemplary embodiment. In the intermediate piston 11, the valve spring 34 can support itself against a stop shoulder 44 formed in the passage opening 43.

The valve spring 34 is preferably provided so as to acts with so low a force that, even while performing an operation, when hydraulic fluid is pumped into the entrance space 14 and from there into the working space 15, the valve 23 can thereby be moved into its opening position, so that the hydraulic fluid can flow relatively freely even through the intermediate piston 11 and into the working space 15.

In this first embodiment, the intermediate piston 11 is further preferably provided with a continuous sealing element 35, which acts between the intermediate piston 11 and the inner surface 13 of the hydraulic cylinder 6. At the same time, this sealing element 35 produces a certain frictional force, which also provides a retention force while pumping hydraulic fluid into the entrance space 14 and from there into the working space 15, thereby resulting in the desired removal of the working piston 10 from the intermediate piston 11 as the pumping in process continues. For example, the sealing element 35 can be an O-ring.

The same conditions are basically present in the second exemplary embodiment according to FIGS. 5 to 8, with the exception of the deviations described below. Therefore, unless any deviations are described, the above statements also remain valid.

As opposed to the first embodiment, the intermediate piston 11 in this second embodiment is designed without the sealing element 35. Rather, a gap opening 36 not further discernible in the drawing is left between the intermediate piston 11 and the inner surface of the hydraulic cylinder 6. The gap opening 36 is preferably adjusted in such a way that, while hydraulic fluid can also flow out of the entrance space 14, while flowing around the intermediate piston 11, as it were, and into the working space 15 during the course of an operation, the hydraulic fluid essentially flows through the valve 23 into the working space 15, as in the initially described embodiment. After an operation has ended, hydraulic fluid can flow out of the working space 15 through the gap opening 36 and into the entrance space 14, heavily throttled. The gap opening 36 is further also adjusted in such a way that, during the course of an operation, the hydraulic fluid flowing through the gap opening 36 is practically negligible in comparison to the hydraulic fluid flowing through the valve 23.

In order to achieve the desired retention force that acts on the intermediate piston 11 in this embodiment, the intermediate piston 11 is loaded with a pressure spring 37, which acts between the working piston 10 and the intermediate piston 11. In further detail, the pressure spring 37 is accommodated in a receiving space 38—preferably designed as a blind hole—of the piston rod 16. The pressure spring 37 acts on a facing end face of the intermediate piston rod 26, in the exemplary embodiment preferably on the coupling extension 24 of the intermediate piston 11.

Figure 6:
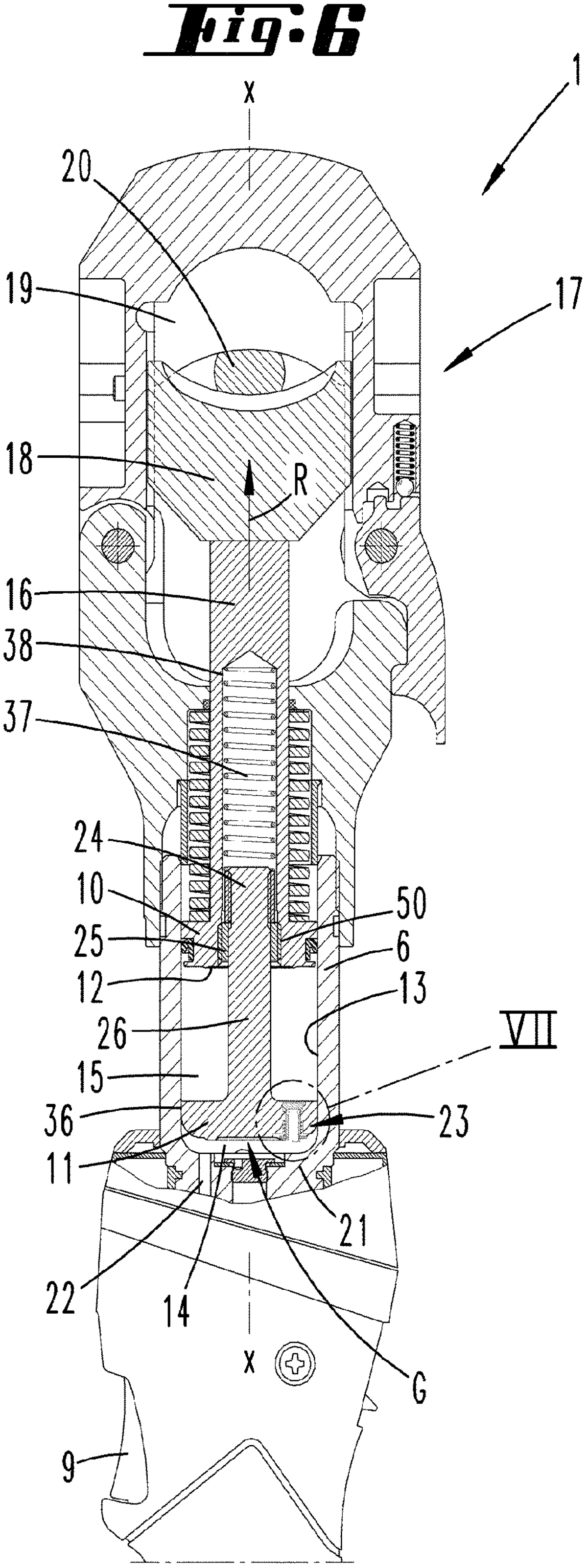
FIG. 6 is the second embodiment at the end of an operation.

Comparably to FIG. 2, the configuration of the second embodiment of FIG. 6 is depicted at the end of an operation. The same conditions as described for FIG. 2 practically arise here. In contrast to the embodiment of FIG. 2, hydraulic fluid exiting the working space 15 when subjected to a sudden drop in the counterforce will practically only drain off via the gap opening 36.

Figure 7:
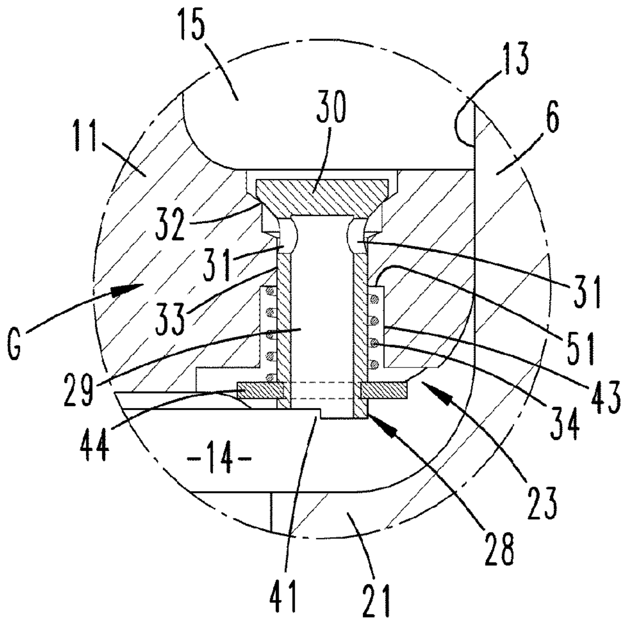
FIG. 7 is the valve in the intermediate piston of the second embodiment in the position according to FIG. 6.
Figure 8:
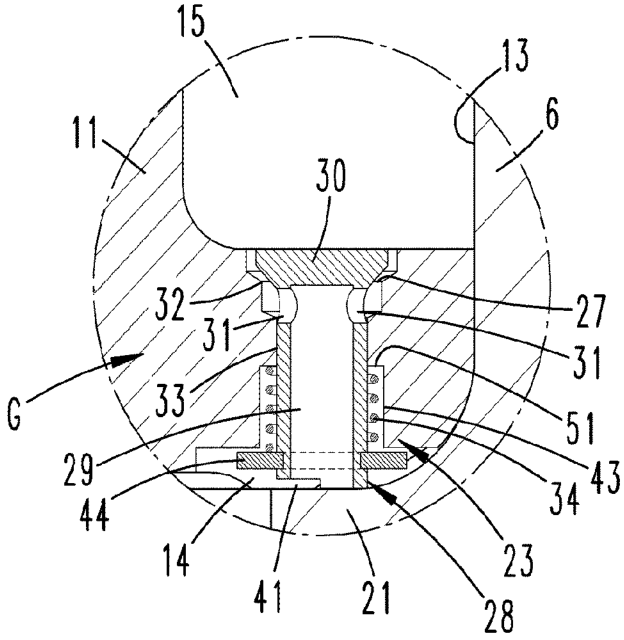
FIG. 8 is the valve in the intermediate piston of the second embodiment in the position according to FIG. 5.

In any event, as preferred in this second embodiment, this draining via only the gap opening 36 is present if the valve 23, as shown in FIGS. 7 and 8, is formed without the outlet 27. When the valve 23 is in the closing position as shown in FIG. 3, a complete closure is instead provided with respect to hydraulic fluid flowing out of the working space 15 into the entrance space 14. In this embodiment as well, however, the valve 23 can alternatively be designed according to the first embodiment.

Figure 5:
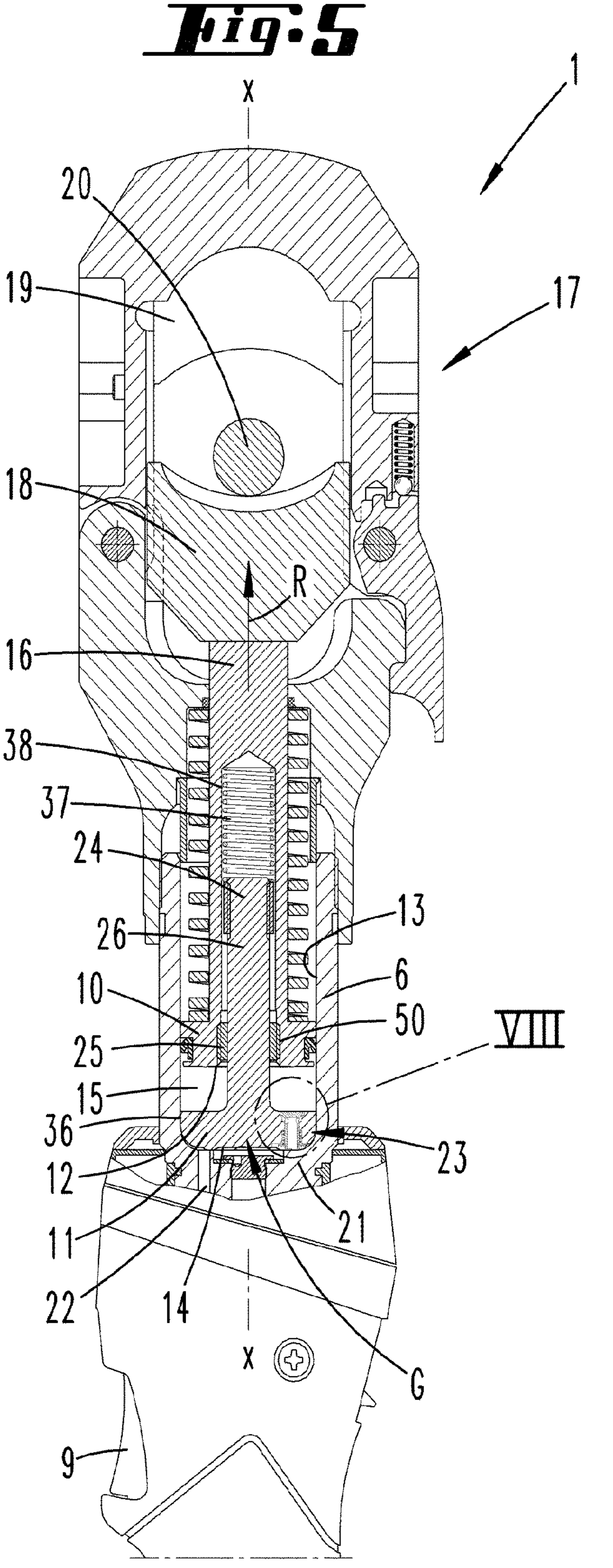
FIG. 5 is a view according to FIG. 1 of a second embodiment.
Figure 9:
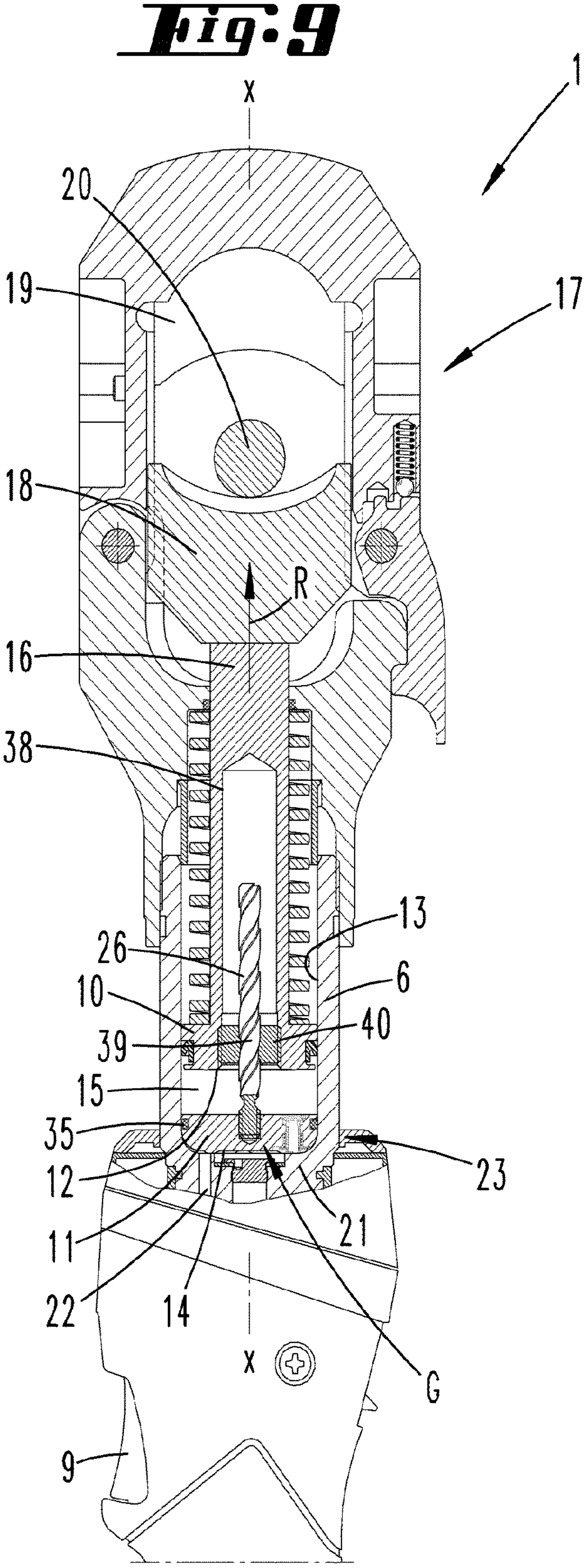
FIG. 9 is a view according to FIG. 1 of another embodiment, in which the intermediate piston is captured by a spindle in a spindle nut of the working piston.

Shown with reference to FIG. 9 is another embodiment, but one in which only the initial state according to FIG. 1 or FIG. 5 is depicted as well. Only the differences in relation to the embodiment of FIG. 9 are also described. Otherwise, the statements made for the first two embodiments apply.

In the embodiment of FIG. 9, it is essential that the intermediate piston 11 be designed with a spindle part 39, which interacts with a spindle nut 40 formed in the working piston 10.

During the course of an operation, the spindle formation 39 can initially move through the spindle nut 40, possibly accompanied by the rotation of the intermediate piston 11, wherein, as described, the intermediate piston 11 here initially also moves away from the working piston 10 at the beginning of an operation, i.e., the working space 15 becomes enlarged.

Further preferably provided in this embodiment with regard to the intermediate piston 11 is a configuration according to the second embodiment, meaning without a sealing element 35. This enables and facilitates the rotation of the intermediate piston 11 inside of the hydraulic cylinder 6 that is present in a possible specific related embodiment.

Since the necessary retention force can simultaneously be set via the interaction between the spindle nut 40 and the spindle part 39, the valve 23 can nevertheless be designed in the manner in which described in relation to the first embodiment. Alternatively, however, the valve 23 can here also be designed according to the second embodiment, if the gap opening 36 as described in relation to the second embodiment is left between the intermediate piston 11 and the inner surface 13 of the hydraulic cylinder 6.

The spindle part 39 correspondingly has a spindle thread with a very large pitch, roughly in the range of 30 to 60 degrees or more. The spindle nut 40 is designed with a corresponding counter-thread.

The spindle nut 40 can be fit tightly into the working piston 10. It is also thereby integral in design.

The spindle part 39 can also be fit directly into the cylinder floor 21. In this case, the intermediate piston 11 can also be eliminated entirely.

The spindle part 39 can be rotatably accommodated in the cylinder floor 21, or also be fixedly connected with the cylinder floor 21, i.e., non-rotatably connected.

With regard to the embodiment with an intermediate piston 11, the spindle part 39 can also be rotatably accommodated in the intermediate piston 11.

Given a fixedly accommodated spindle part 39, the spindle nut 40 can be movably accommodated in the working piston 10, specifically so that it can rotate around an axis of the spindle part while the spindle part moves relative to the spindle nut.

Figure 10:
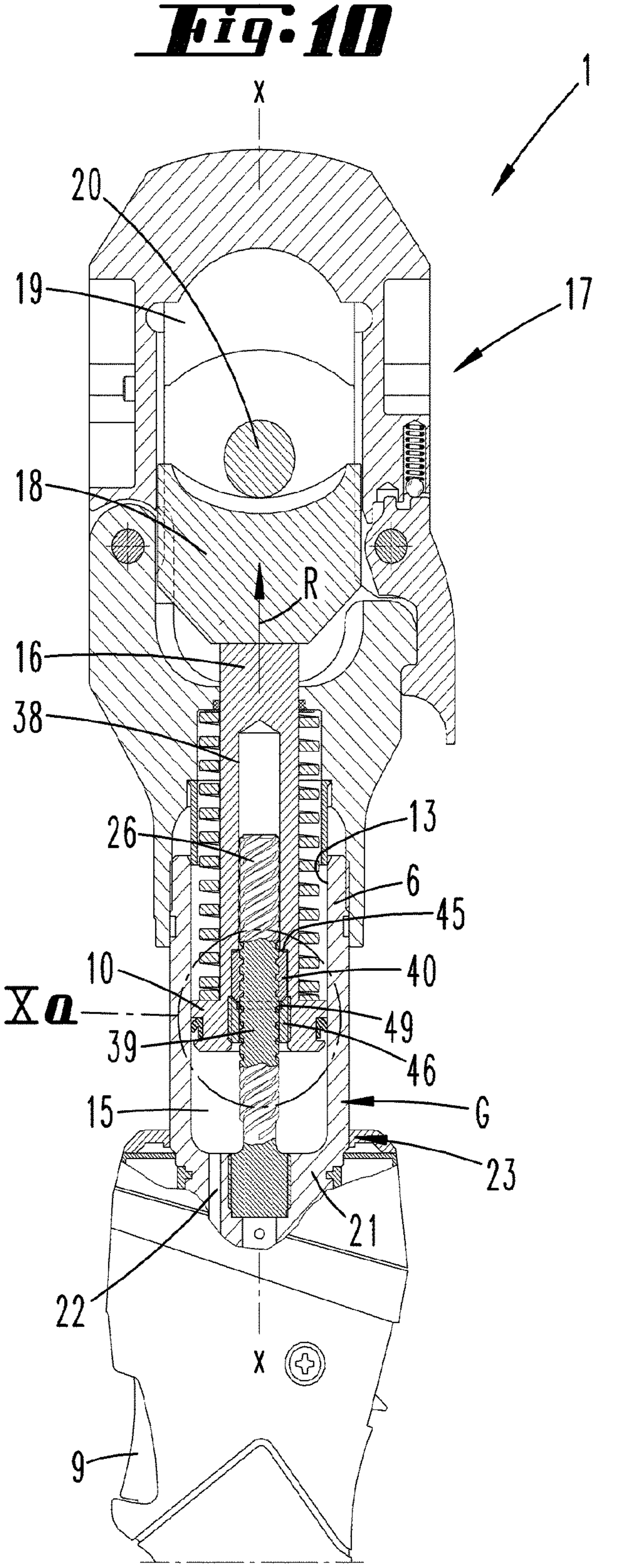
FIG. 10 is a view according to FIG. 9, but wherein the counter-bracket is formed by the hydraulic cylinder.

Shown with reference to FIG. 10 is another embodiment, which in particular illustrates a possible formation of the counter-bracket by the hydraulic cylinder 6.

Also provided in this embodiment is a spindle part 39 that is here directly anchored in the cylinder floor 21. As shown, it can be screw anchored in the cylinder floor 21.

In the exemplary embodiment shown, the spindle part 39 is not operationally rotatably anchored in the cylinder floor 21.

In this embodiment, the spindle nut 40 is movably—specifically rotatably—accommodated in the working piston 10. The spindle nut 40 is mounted between a front stop 45 in the working direction R and a rear stop 46 in the working direction R. As shown, the rear stop 46 is preferably formed by a screw-in part.

A stop surface 47 of the rear stop 46 as well as further, preferably, a corresponding counter-surface 48 of the spindle nut 40 run diagonally in relation to a longitudinal axis of the hydraulic cylinder 6 or in relation to the working direction R in the cross-sectional view of FIG. 10. This can result in a favorable, self-locking pair of surfaces in the event that the surfaces lie one on top of the other under exposure to an applied force given a sudden loss in counterforce. This makes it possible to effectively prevent the rotation of the spindle nut 40 for this instant of lost counterforce.

Figure 10A:
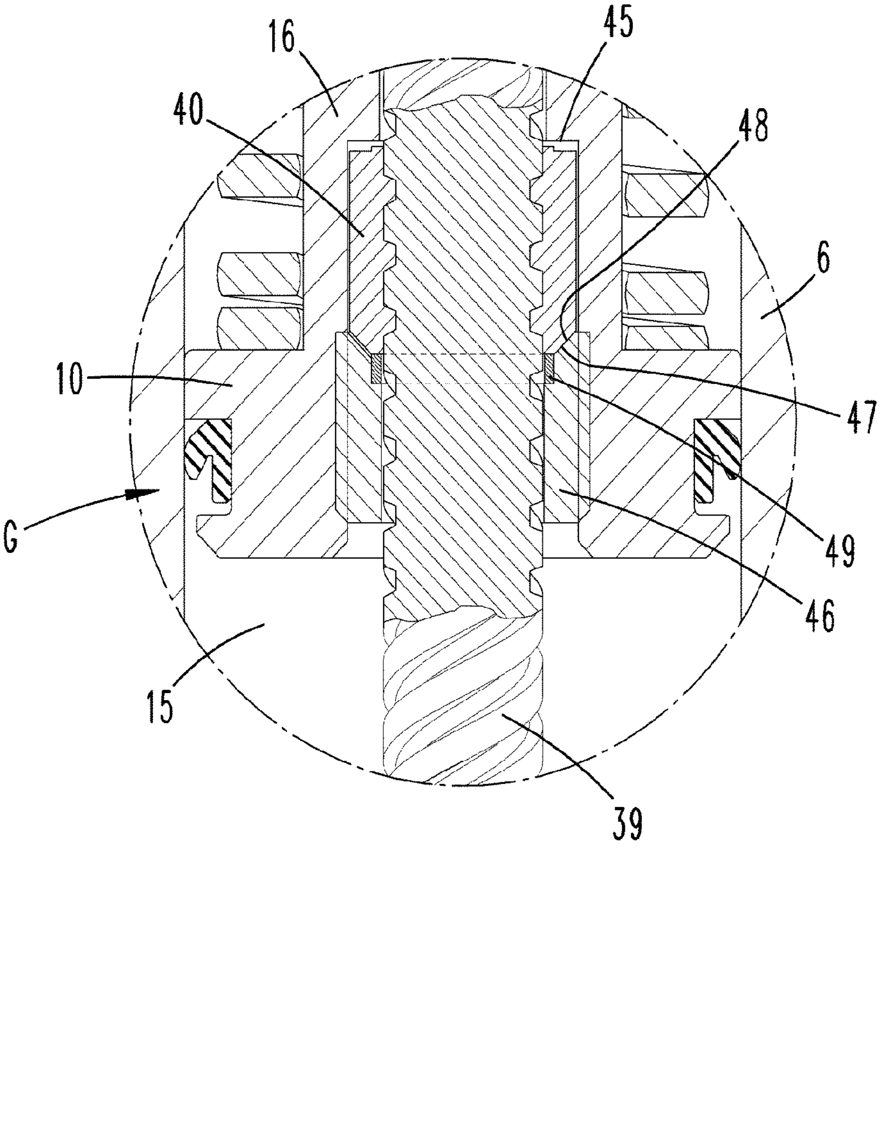
FIG. 10*a* is a magnified view of the Xa area on FIG. 10.

In order to nevertheless prevent the spindle nut 40 from causing any significant impairment as the working piston 10 advances during the course of an operation, it is preferred and provided in the exemplary embodiment that the spindle nut 40 be tensioned away from the rear stop 46 by a spring element 49, see also magnified view of FIG. 10*a*.

Figure 12:
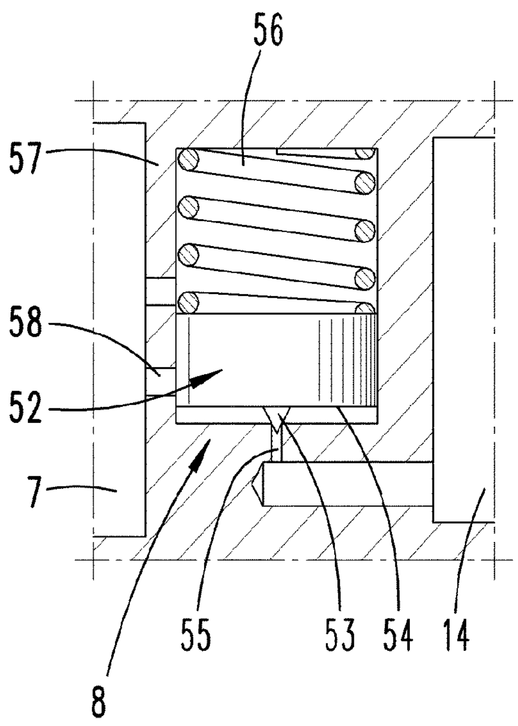
FIG. 12 in a schematic view of a return valve.

FIG. 12 shows a schematic representation of the above-mentioned return valve 8.

The return valve 8 is arranged essentially in a region between the entrance space 14 and the supply space 7 and further essentially comprises a valve piston 52 with a pointed tapered needle tip 53 arranged centrally at the end face to form a partial piston surface (poppet valve effective surface) which is substantially smaller than a total piston surface 54 and is defined by the diameter of a bore 55 connected to the entrance space 14. The latter is closed by the needle tip 53 in an initial closing position, as shown in FIG. 12.

A pressure spring 56 acts on the rear of the valve piston 52, pressing the needle tip 53 against the bore 55 with a force that helps to determine a maximum triggering pressure.

In order to ensure proper operation of the working tool 1, it is desired that the return valve 8 is triggered automatically or even volitionally. For example, it can be provided that at a pressure of, for example, 500 or 600 bar, the return valve 8 opens. This maximum pressure is defined by the very small partial piston area of the needle tip 53 projected onto the bore 55 or by the cross-sectional area of the bore 55 and by the contact pressure of the pressure spring 56 on the valve piston 52.

If the oil pressure now exceeds the predefined maximum value, the valve piston 52 is moved out of its seat sealing against the bore 55 against the force of the pressure spring 56, whereupon a substantially larger piston area, namely the total piston area 54 of the valve piston 52, suddenly comes into action. As a result of the backward displacement of the valve piston 52, a drain opening 58 arranged in the cylinder

57 accommodating the valve piston 52 is at least partially uncovered for the return flow of the hydraulic medium into the supply space 7.

It can also be possible for the user of the working tool 1 to deliberately open the return valve 8, for example by arranging a manually operable lever which can act directly or indirectly on the valve piston 52 from the outside, for example when arranged in the handle area, in such a way that, when the lever is actuated accordingly, the valve piston 52 is lifted from its valve seat against the restoring force of the pressure spring 56, so that both the bore 55 and the discharge opening 58 are released for the return flow of the hydraulic medium into the supply space 7.

REFERENCE LIST

1 Hydraulic work tool
2 Accumulator
3 Motor
4 Gearbox
5 Pump
6 Hydraulic cylinder
7 Supply space
8 Return valve
9 Actuation switch
10 Working piston
11 Intermediate piston
12 Actuation surface
13 Inner surface
14 Entrance space
15 Working space
16 Piston rod
17 Working head
18 First, movable blade
19 Second, immovable blade
20 Object
21 Cylinder floor
22 Hydraulic line
23 Valve
24 Coupling extension
25 Coupling stop
26 Intermediate piston rod
27 Outlet
28 Extension
29 Feedthrough section
30 Closure formation
31 Outlet
32 Closure shoulder
33 Passage opening
34 Valve spring
35 Sealing element
36 Gap opening
37 Compression spring
38 Receiving space
39 Spindle part
40 Spindle nut
41 Opening
42 Return line
43 Passage opening
44 Stop shoulder
45 Stop, front
46 Stop, rear
47 Stop surface
48 Counter-surface
49 Spring element
a Initial distance
R Working direction

The invention claimed is:

1. A set-up comprising:

a hydraulic cylinder;

a hydraulically actuatable working piston, the working piston is moveable within the hydraulic cylinder and is configured to transmit a working force to an object to be machined outside the hydraulic cylinder, building up a counterforce, wherein the working piston comprises a pressurization surface which limits a pressurization space existing between the working piston and the hydraulic cylinder in a direction of operation, in which the working force is transmitted;

hydraulic fluid provided in the hydraulic cylinder, wherein an ingress of the hydraulic fluid into the pressurization space enlarges the pressurization space and acts on the working piston to move the working piston in the direction of operation to the pressurization surface; and a counterholder, wherein the counterholder is formed by an intermediate piston arranged in front of the working piston in the direction of operation, and the intermediate piston comprises a coupling extension for interaction with a coupling stop of the working piston, or wherein the counterholder is formed by the hydraulic cylinder and the working piston is mechanically coupled to the hydraulic cylinder via a spindle part, and wherein the working piston is configured to be mechanically restrained in the direction of operation before reaching a stop position via a mechanical coupling between the working piston and the counterholder when a drop in the counterforce occurs, thereby preventing additional movement of the working piston in the direction of operation, which can occur without the drop in the counterforce.

2. The set-up according to claim 1, wherein the pressurization space is divided by the intermediate piston into a preliminary space and a working space, wherein the preliminary space is formed between a cylinder bottom of the hydraulic cylinder and the intermediate piston, and the working space is formed between the working piston and the intermediate piston, wherein the hydraulic fluid is formed to flow from the preliminary space into the working space in order to enlarge the working space, and wherein the mechanical coupling between the working piston and the intermediate piston is formed to compensate for an effect of the hydraulic fluid located in the working space when a drop in the counterforce occurs.

3. The set-up according to claim 1, wherein, with the intermediate piston, only the working piston serves to act on the object, in a sense of a transmission of the working force onto the object.

4. The set-up according to claim 1, wherein the coupling extension is designed to pass through the pressurization surface.

5. The set-up according to claim 1, wherein the coupling stop is formed in the pressurization direction behind the pressurization surface.

6. The set-up according to claim 1, wherein the intermediate piston is preloaded in a position distanced away from the working piston.

7. The set-up according to claim 1, wherein the intermediate piston comprises a passage opening and furthermore comprises a valve arranged within the passage opening, wherein the valve is moveable between an opening position and a closure position.

8. The set-up according to claim 7, wherein the pressurization space is divided by the intermediate piston into a preliminary space and a working space, wherein the preliminary space is formed between a cylinder bottom of the hydraulic cylinder and the intermediate piston, and the working space is formed between the working piston and the intermediate piston, wherein the hydraulic fluid is formed to flow from the preliminary space into the working space in order to enlarge the working space, wherein the mechanical coupling between the working piston and the intermediate piston is formed to compensate for an effect of the hydraulic fluid located in the working space when a drop in counterforce occurs, and wherein the valve is configured to allow the hydraulic fluid to flow from the preliminary space into the working space.

9. The set-up according to claim 7, wherein the valve is configured to allow a reduced flow rate of the hydraulic fluid in the closed position in comparison to the opening position.

10. The set-up according to claim 7, wherein the valve is configured to be guided into the opening position by a stop.

11. The set-up according to claim 7, wherein the valve is preloaded to its closure position.

12. The set-up according to claim 1, wherein the intermediate piston leaves a gap opening to an inner surface of the hydraulic cylinder.

13. The set-up according to claim 1, wherein the pressurization space is divided by the intermediate piston into a preliminary space and a working space, and wherein the intermediate piston is configured to be applied independently of the working force, with a retaining force which has a supporting effect with regard to a flow of the hydraulic fluid into the working space via the intermediate piston in order to enlarge the working space.

14. The set-up according to claim 13, wherein the restraint retaining force allows the intermediate piston to move in the direction of operation.

15. The set-up according to claim 1, wherein the spindle part is rotatable.

16. The set-up according to claim 1, wherein the spindle part is fixed into position.

17. The set-up according to claim 1, wherein the spindle part is fixed in the intermediate piston.

18. The set-up according to claim 1, wherein the spindle part is fixed in the hydraulic cylinder.

19. A combination of the set-up according to claim 1 and a hydraulic tool comprising a working head.

20. The set-up and the hydraulic tool according to claim 19, wherein the hydraulic tool is a cutting tool.

21. A set-up comprising:

a hydraulic cylinder;

a hydraulically actuatable working piston comprising a coupling stop, the working piston being moveable within the hydraulic cylinder and is configured to transmit a working force to an object to be machined outside the hydraulic cylinder, building up a counterforce, the working piston comprising a pressurization surface, which limits a pressurization space existing between the working piston and the hydraulic cylinder in a direction of operation, in which the working force is transmitted;

hydraulic fluid provided in the hydraulic cylinder, wherein an ingress of the hydraulic fluid into the pressurization space enlarges the pressurization space and acts on the working piston to move the working piston in the direction of operation to the pressurization surface, a counterholder comprising an intermediate piston or being formed by the hydraulic cylinder, and a coupling extension is formed on the counterholder; and wherein the working piston is configured to be mechanically restrained before reaching a stop position in the direction of operation by a mechanical coupling between the working piston and the counterholder when a drop in the counterforce occurs, thereby preventing additional movement of the working piston in the direction of operation, which can occur without a drop in the counterforce.

22. Method for absorbing shock of a hydraulically actuatable working piston that is moveable within a hydraulic cylinder, for transmitting a working force to an object to be machined outside the hydraulic cylinder, building up a counterforce, wherein the working piston comprises a pressurization surface, the pressurization surface limits a pressurization space existing between the working piston and the hydraulic cylinder in a direction of operation, in which the working force is transmitted, and hydraulic fluid for movement of the working piston in the direction of operation onto the pressurization surface subject to an enlargement of the pressurization space is introduced into the pressurization space, wherein, in an event of a sudden drop in the counterforce before reaching a stop position in the direction of operation, further movement of the working piston, which is possible without the drop in the counterforce, is hindered in the direction of operation by a mechanical restraint of the working piston, wherein a hindrance takes place via a mechanical coupling between the working piston and a counterholder, that an intermediate piston is provided as the counterholder, that the intermediate piston is arranged in the direction of operation in front of the working piston, that the pressurization space is divided into a preliminary space and a working space by the intermediate piston, wherein the preliminary space is located between a cylinder base and the intermediate piston, and the working space is located between the working piston and the intermediate piston, that hydraulic fluid is guided from the preliminary space into the working space subject to an enlargement of the working space, and that, in an event of a sudden drop in the counterforce by a mechanical coupling between the working piston and the intermediate piston, a movement of the pistons directed away from one another is prevented, or that the hydraulic cylinder is provided as the counterholder, and the mechanical coupling between the working piston and the hydraulic cylinder is carried out via a spindle part.

* * * * *